United States Patent
Haas et al.

(10) Patent No.: US 7,446,891 B2
(45) Date of Patent: Nov. 4, 2008

(54) FRAGILE WATERMARK FOR DETECTING PRINTED IMAGE COPIES

(75) Inventors: Bertrand Haas, New Haven, CT (US); Robert A. Cordery, Danbury, CT (US); Claude Zeller, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 989 days.

(21) Appl. No.: 10/720,664

(22) Filed: Nov. 24, 2003

(65) Prior Publication Data

US 2005/0114668 A1    May 26, 2005

(51) Int. Cl.
  *G06K 15/00*  (2006.01)
  *G06F 1/00*  (2006.01)
(52) U.S. Cl. .................. 358/1.15; 358/1.2; 358/1.9; 382/103; 382/232
(58) Field of Classification Search ................ 358/1.15, 358/1.2, 1.5, 1.9; 382/103, 232, 100, 274, 382/250
See application file for complete search history.

(56) References Cited

U.S. PATENT DOCUMENTS

| | | | |
|---|---|---|---|
| 4,910,460 A | 3/1990 | Sebok | |
| 5,825,892 A * | 10/1998 | Braudaway et al. | 380/51 |
| 5,925,892 A * | 7/1999 | Mizuno et al. | 257/34 |
| 6,185,312 B1 | 2/2001 | Nakamura et al. | 382/100 |
| 6,317,115 B1 | 11/2001 | Yokomizo et al. | |
| 6,332,030 B1 | 12/2001 | Manjunath et al. | 382/100 |
| 6,332,194 B1 | 12/2001 | Bloom et al. | |
| 6,385,329 B1 | 5/2002 | Sharma et al. | 382/100 |
| 6,711,276 B1 | 3/2004 | Yoshiura et al. | 382/100 |
| 6,728,408 B1 * | 4/2004 | Echizen et al. | 382/232 |
| 6,804,379 B2 | 10/2004 | Rhoads et al. | 382/101 |
| 6,823,455 B1 | 11/2004 | Macy et al. | 713/176 |
| 6,993,151 B2 | 1/2006 | Tsai et al. | 382/100 |
| 7,054,461 B2 * | 5/2006 | Zeller et al. | 382/100 |
| 7,065,237 B2 | 6/2006 | Murakami | 382/137 |
| 7,130,442 B2 * | 10/2006 | Braudaway et al. | 382/100 |
| 7,158,652 B2 * | 1/2007 | Iwamura | 382/100 |
| 2001/0040979 A1 | 11/2001 | Davidson et al. | 382/100 |
| 2002/0015509 A1 * | 2/2002 | Nakamura et al. | 382/100 |
| 2002/0126870 A1 | 9/2002 | Wendt | 382/100 |
| 2002/0157005 A1 | 10/2002 | Brunk et al. | 713/176 |
| 2002/0176114 A1 | 11/2002 | Zeller et al. | 358/3.28 |
| 2003/0026453 A1 | 2/2003 | Sharma et al. | 382/100 |
| 2003/0053653 A1 | 3/2003 | Rhoads | 382/100 |
| 2003/0159046 A1 | 8/2003 | Choi et al. | 713/176 |
| 2003/0215112 A1 | 11/2003 | Rhoads et al. | 382/100 |
| 2004/0030899 A1 | 2/2004 | Lee | 713/176 |

(Continued)

FOREIGN PATENT DOCUMENTS

WO    03/012727 A1    2/2003

*Primary Examiner*—Edward L Coles
*Assistant Examiner*—Negussie Worku
(74) *Attorney, Agent, or Firm*—Ronald Reichman; Angelo N. Chaclas (57) ABSTRACT

The present invention is concerned with inclusion of a "fragile watermark" in an original printed document to aid in a determination whether a document under examination is an original or a copy. The watermark may be applied by making small tonal adjustments on a pixel block by pixel block basis in data used to generate the original document. Documents to be verified may then be examined on a block-by-block basis after scanning.

14 Claims, 10 Drawing Sheets

U.S. PATENT DOCUMENTS

| | | | |
|---|---|---|---|
| 2004/0105569 A1 | 6/2004 | Sharma et al. | 382/100 |
| 2004/0153649 A1 | 8/2004 | Rhoads et al. | 713/176 |
| 2004/0236951 A1 | 11/2004 | Zhao | 713/179 |
| 2005/0114668 A1 | 5/2005 | Haas et al. | 713/176 |
| 2006/0045306 A1 | 3/2006 | Cordery et al. | 382/100 |

* cited by examiner

FRAGILE WATERMARK FOR DETECTING PRINTED IMAGE COPIES

CROSS REFERENCE TO RELATED APPLICATIONS

Reference is made to commonly assigned copending patent applications, application Ser. No. 10/720,292 filed herewith entitled "Detecting Printed Image Copies Using Phase-Space-Encoded Fragile Watermark" in the names of Robert A. Cordery, Claude Zeller and Bertrand Haas; and application Ser. No. 10/720,503 filed herewith entitled "Watermarking Method with Print-Scan Compensation" in the name of Bertrand Haas.

BACKGROUND

This invention relates generally to the field of printed document security, and, more particularly, to image data processing for the purpose of watermarking of printed images in a manner that facilitates detection of copies.

Advances in the arts of photocopying and digital image scanning and printing have made it increasingly easy to make copies of printed documents with rather high fidelity such that it is difficult to distinguish between an original printed document and a photocopy or scanned-and-printed copy of the original document. These advances have implications in regard to such secure documents as postage meter indicia, paper currency, and event and travel tickets. Therefore, it is desirable to provide secure documents with printed images that incorporate special features, sometimes referred to as "fragile watermarks", wherein copying of the printed image results in changes of the feature in the copy relative to the original image in a manner that can be detected with a degree of reliability and convenience.

SUMMARY

Accordingly, methods are provided for incorporating fragile watermarks in printed images, and for determining whether such a watermark is present in a document whose authenticity is to be determined.

In one aspect, a method of watermarking an image to facilitate detection of copying of the image is provided. The method includes providing image data that represents an image. The image data includes pixel data that represents gray-scale values of the image. The method further includes forming a plurality of data blocks from the image data. Each data block consists of pixel data which corresponds to a respective region of the image. The method also includes determining for each of the data blocks an average value of the pixel data in the data block, and determining for each of the data blocks a target for the average value of the pixel data in the data block. In addition, the method includes adjusting respective values of at least some of the pixel data in each of at least some of the data blocks to shift the average value of the pixel data in the respective data block toward the target for the respective data block.

The respective target for each data block may be determined based at least, in part, on a value of a message bit that corresponds to the respective data block. Alternatively, or in addition, the respective target for each data block may be selected from a predetermined set of gray scale levels as the one of the set of gray scale values that is closest to the average pixel data value in the data block.

The adjusting of the pixel data values to shift the block toward the target average may commence at the center of the block and may proceed outward toward the edges of the block.

In another aspect, a method is provided for determining whether a printed-image-under-examination (PIUE) is a copy of an original printed image. The method includes scanning the PIUE to generate scanned image data. The scanned image data includes pixel data, and the pixel data includes gray scale values and represents the PIUE as a set of scanning pixels. The method further includes forming a plurality of data blocks from the scanned image data. Each data block consists of pixel data which corresponds to a respective region of the PIUE. The method also includes determining for each of the data blocks an average value of the pixel data in the data block, and determining for each of the data blocks an index value based on the average value of the pixel data in the data block. In addition, the method includes calculating, for each data block, a difference between the index value for the data block and a value that represents a target value for a corresponding block of pixel data that was used to generate the original printed image.

The index value for each data block may be selected from a predetermined set of gray scale values to be the particular value of the set that is closest to the average value of the pixel data of the data block.

The method may further include squaring the differences for each block, summing the squared differences, and comparing the resulting sum with a threshold. The method may also include providing an indication as to whether the PIUE is an original printed image on the basis of a result of the comparison of the sum with the threshold.

In a further aspect, a method is provided for determining whether a (PIUE) is a copy of an original printed image. The method includes scanning the PIUE to generate scanned image data. The scanned image data includes pixel data, and the pixel data includes gray scale values and represents the PIUE as a set of scanning pixels. The method further includes forming a plurality of data blocks from the scanned image data. Each data block consists of pixel data which corresponds to a respective region of the PIUE. The method also includes determining for each of the data blocks an average value of the pixel data in the data block, and determining for each of the data blocks an index value based on the average value of the pixel data in the data block. In addition, the method includes calculating, for each data block, a difference between the index value for the data block and an expected value of the index value.

Use of a fragile watermark based on small tonal shadings of a gray-scale image, as described above, may be particularly cost effective and convenient, especially in regard to detection of copying of original printed images.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As FIG. 1 is a block diagram that illustrates an apparatus provided in accordance with the invention for incorporating fragile watermarks in postage meter indicia.

DETAILED DESCRIPTION

In the method of the present invention, a watermark is impressed on image data by subtly changing the gray scale tone of the image on a block-by-block basis within the image. The watermark is such that the tonal distortions of scanning and reprinting from scanned data tend to partially or totally obliterate the watermark. To determine whether a printed document is an original with the watermark substantially intact, or a copy in which the watermark has been compromised, the printed document is scanned, and a block-by-block analysis of the resulting data is performed in comparison with known characteristics of the watermark which was incorporated in the original image.

Figure 1:
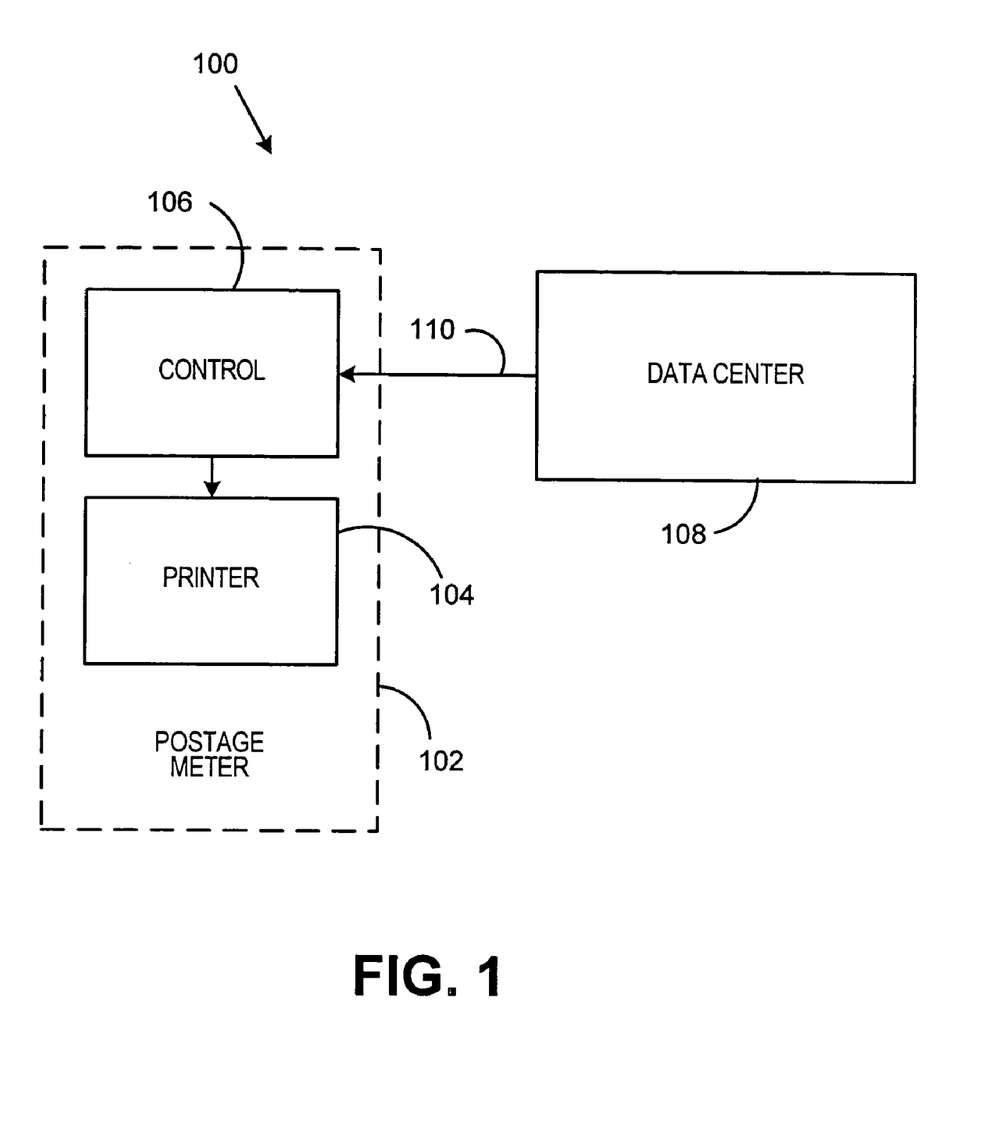

Referring now to the drawings, and particularly to FIG. 1, the reference numeral 100 indicates generally an apparatus for printing watermarked images in accordance with principles of the present invention. The printing apparatus 100 includes a postage meter 102. The postage meter 102, in turn, includes a printer 104 and control circuitry 106 that is coupled to, and controls operation of, the printer 104. (Although embodiments of the present invention are described herein in the context of postage metering, those who are skilled in the art will recognize that the methods of the invention may also be applied to production and verification of other types of secure documents, including paper currency, travel and event tickets, and identification documents.) The printer 104 may be of a type that is capable of printing gray scale images. For example, the printer 104 may include a dye-sublimation printer. In some embodiments, the printer may be capable of printing 256 gray levels.

The printing apparatus 100 also includes a data center 108 that is in communication with the control circuitry 106 of the postage meter 102 via a data communication channel 110. The data center 108 may generate a watermarked image in accordance with the invention, and may download to the postage meter 102 image data which represents the watermarked image. Using the downloaded image data, the postage meter 102 may print the watermarked image as a part of postage meter indicia applied to mailpieces, which are not shown. Thus the mailpieces, and particularly the postage meter indicia thereon, may constitute original documents which a postal authority may wish to verify.

Figure 2:
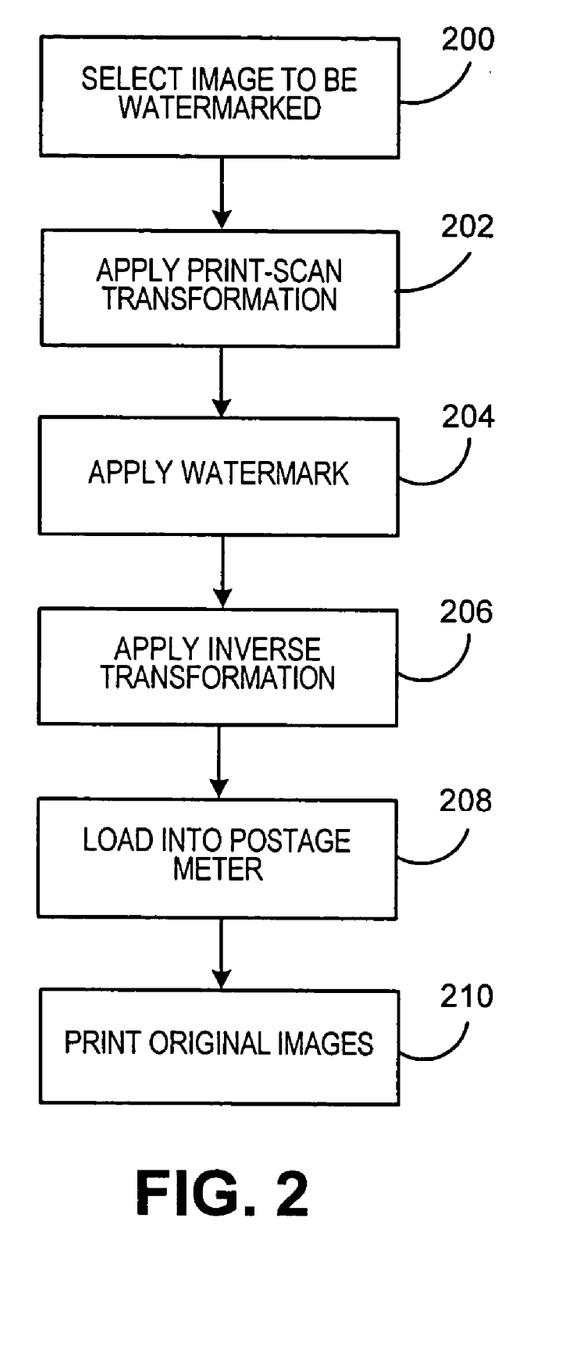
FIG. 2 is a flow chart that illustrates a process that may be provided in accordance with the invention for generating and printing watermarked images.

FIG. 2 is a flow chart that illustrates a process performed in accordance with the invention in the printing apparatus 100 of FIG. 1.

Initially, at step 200, an image is selected for watermarking. In some embodiments the image may be a standard image that is required to be printed as part of every postage meter indicia by every postage meter, or by every postage meter that is part of a program for incorporating a gray scale image in postage meter indicia. In other embodiments, the image may be one of a number of standard images, any one of which may be selected by the lessor of a postage meter as the image to be incorporated in indicia to be printed by the particular postage meter. In still other embodiments, the image may be a gray scale image that is chosen by the lessor of the postage meter from among images available for purchase or licensing, or may be generated by the lessor of the postage meter. In these cases the selected image may be sent by the lessor of the postage meter to the data center for watermarking so that the image can be incorporated in indicia to be printed by the particular postage meter.

In some embodiments, the image to be watermarked may be represented by pixel data that represents, with respect to each pixel of the image, a gray scale level. The number of available gray scale levels may be 256, in some embodiments. In such embodiments, each pixel may be represented by one 8-bit byte of image data, and the value of each pixel may be an integer n, with n greater than or equal to zero and less than or equal to 255. Each value of n may correspond to a different gray scale level; in some embodiments the zero value corresponds to white (no tone), the value 255 corresponds to black, and each value of n corresponds to a tone which is darker than the tone which corresponds to n minus one.

Figure 3:
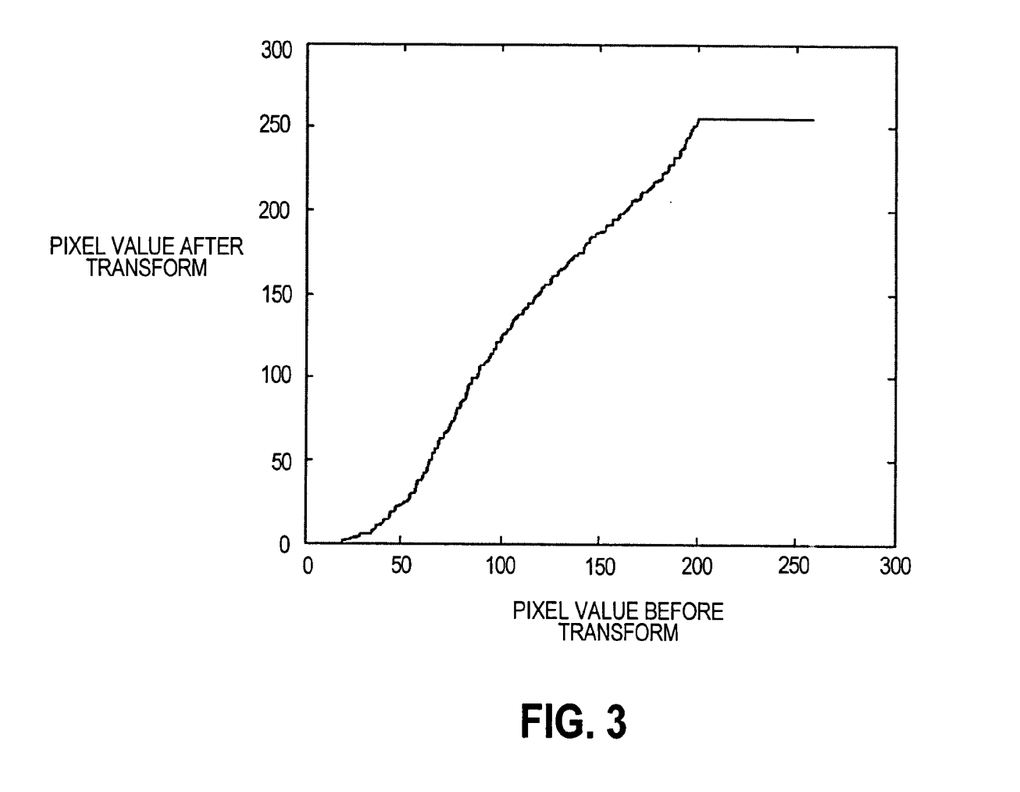
FIG. 3 is a graph that illustrates a transformation that may be applied to pixel values of an image to simulate changes in pixel values that may result from scanning a printed gray-scale image and then printing a copy of the image using data generated by the scanning of the printed image.

Following step 200 is step 202. At step 202 a transformation may be applied to the image data which corresponds to the image. The transformation may substantially approximate the effect on pixel values of first printing the image with the type of printer employed in the postage meter, and then scanning the resulting image with a scanner of the type which is to be employed to verify the postage indicia. FIG. 3 is a graph that illustrates an example of the transformation that may be applied at step 202. In the graph of FIG. 3, the horizontal axis corresponds to pixel values prior to transformation, and the vertical axis corresponds to pixel values to which the prior values are mapped by the transformation.

Step 204 follows step 202 in FIG. 2. At step 204 a watermark is applied, in accordance with principles of the present invention, to the image selected at step 200, as transformed at step 202.

Figure 4:
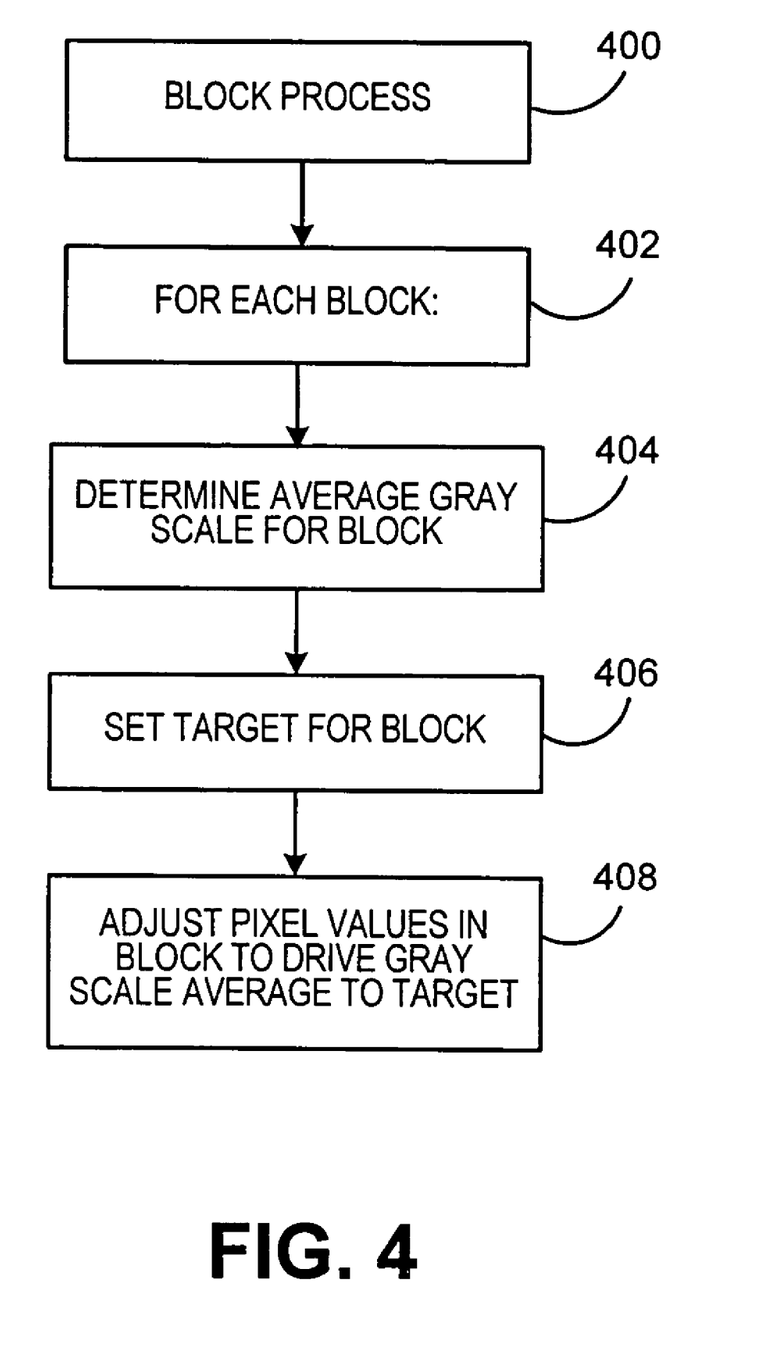
FIG. 4 is a flow chart that illustrates some details of a step of the process of FIG. 2.
Figure 5:
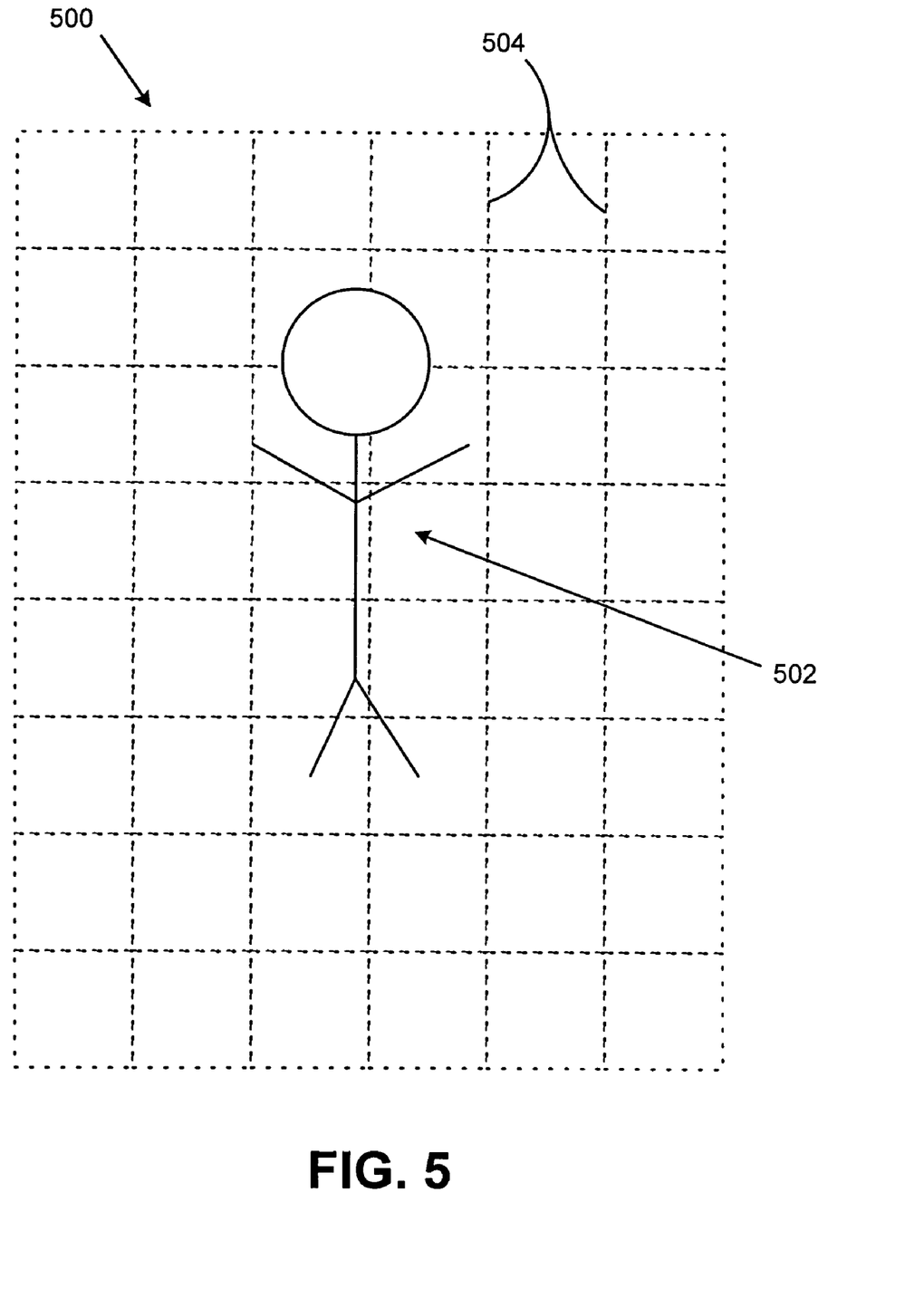
FIG. 5 is a schematic illustration of image information to which a watermark may be applied.

FIG. 4 is a flow chart that illustrates some details of the watermarking operation represented by step 204 in FIG. 2. The watermarking operation is performed on a block-by-block basis, and the image data resulting from step 202 is accordingly divided into data blocks, as represented by step 400 of FIG. 4 and as schematically illustrated in FIG. 5. In FIG. 5, reference numeral 500 generally indicates a two-dimensional array of image information which represents an image to be watermarked. To simplify the drawing, the image represented by the image information array is indicated by a line drawing image 502 against a white background. However, in practice, it is to be understood that most or all of the pixel values in the image information array 500 may be non-zero gray scale levels, so that only a relatively few pixels, corresponding to highlights of the image, may be white (corresponding to pixel value "0").

The lattice 504 indicated in FIG. 5 represents the division of the image information array 502 (i.e., division of the image plane) into a plurality of pixel data blocks, each corresponding to a respective region of the image. In some embodiments the regions of the image to which the data blocks correspond may be rectangular (e.g., square, as illustrated in FIG. 5). For the sake of illustration, a 6×8 array of pixel blocks is indicated as an example division of the image plane into data blocks. Other dimensions of arrays are possible and in practice a larger number of data blocks is likely to be employed. The regions in the image plane which correspond to the data blocks may be "discrete" in the sense that there is no overlap between the regions (i.e., no pixel resides in more than one region).

In some embodiments, for example, the image information array may be formed as 180 pixels by 240 pixels, to be printed at a resolution of 200 dots (pixels) per inch, and divided into 10-pixel-by-10-pixel data blocks to result in an 18×24 array of data blocks. It should be understood that any and all of these parameters may be varied.

Referring again to FIG. 4, steps 404, 406 and 408 may be performed with respect to each data block, as indicated at 402. For a particular block, then, step 404 indicates that an average gray scale level for the pixels in the block may be determined. For example, in the case of the 100-pixel (10×10) blocks referred to in the previous paragraph, the pixel values of the 100 pixels could be summed and the resulting sum divided by 100 to obtain the average gray scale level for the data block.

The next action to be taken for the particular data block, with the average gray scale value known, is to determine a target average gray scale value for the data block, as indicated at step 406 in FIG. 4. This may be done in a number of ways, and may be based on a system of indexing the (e.g.) 256 gray scale levels that are the possible pixel values according to some embodiments. In some embodiments the index value may be represented by the variable k, where k is an integer greater than or equal to zero and less than or equal to 31. In these embodiments the potential target average gray scale levels may be a set of values expressed by 8*k, where k takes the range of values stated in the previous sentence. Thus, the set of potential target levels may be gray scale levels that are integral multiples of eight. A particular target value for a given data block may be selected from that set of target values as the value of that set to which the average gray scale level for the data block is closest. In other embodiments the set of potential target levels may be multiples of a number other than eight.

Figure 6:
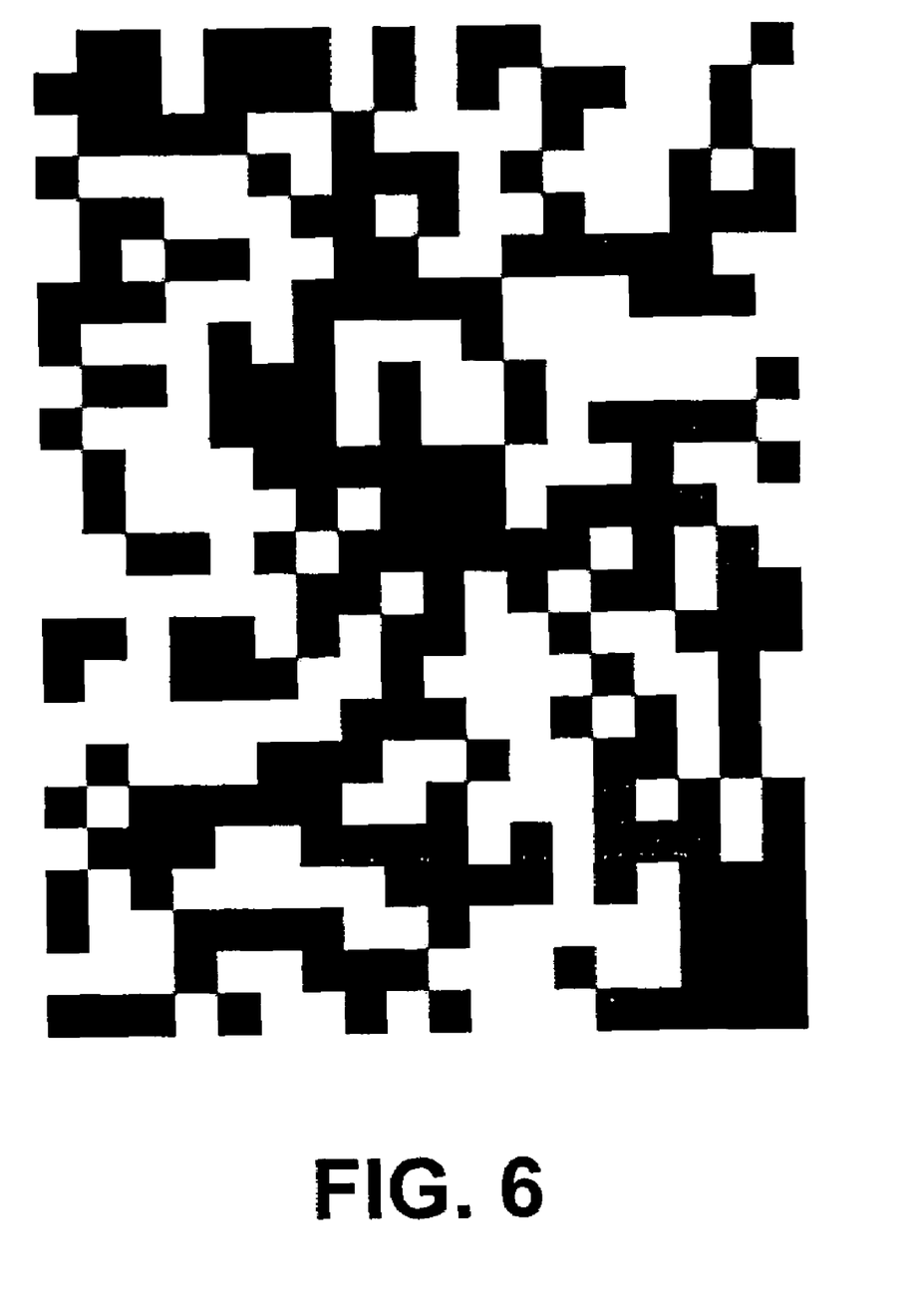
FIG. 6 is a schematic illustration of a watermarking message that may be applied to the image information according to some embodiments.

In other embodiments, selection of the target value may depend in part on the value of a message bit that corresponds to the data block. More specifically, a message (which may simply be random data) may be generated as an n×m array of bits, where the dimensions of the array of data blocks are n and m. An example of such a message array is schematically illustrated in FIG. 6, with "1" bits represented by black squares and "0" bits represented by white squares. Each bit of the message array may correspond to the data block which has the same position in the array of data blocks.

To apply the message bit for a data block to selecting the target gray scale value for the data block, the two closest potential target values may be determined (i.e., the two potential target values which bracket the average gray scale level for the data block). It will be appreciated that one of these two potential target values corresponds to an odd value of k and the other of these two potential target values corresponds to an even value of k. In some embodiments, the potential target value which corresponds to the odd value of k may be selected if the message bit for the data block has the value "1", and the potential target value which corresponds to the even value of k may be selected if the message bit for the data block has the value "0". Of course, the opposite convention may be employed, such that the potential target value which corresponds to the odd value of k may be selected if the message bit for the data block has the value "0", and the potential target value which corresponds to the even value of k may be selected if the message bit for the data block has the value "1".

Figure 7:
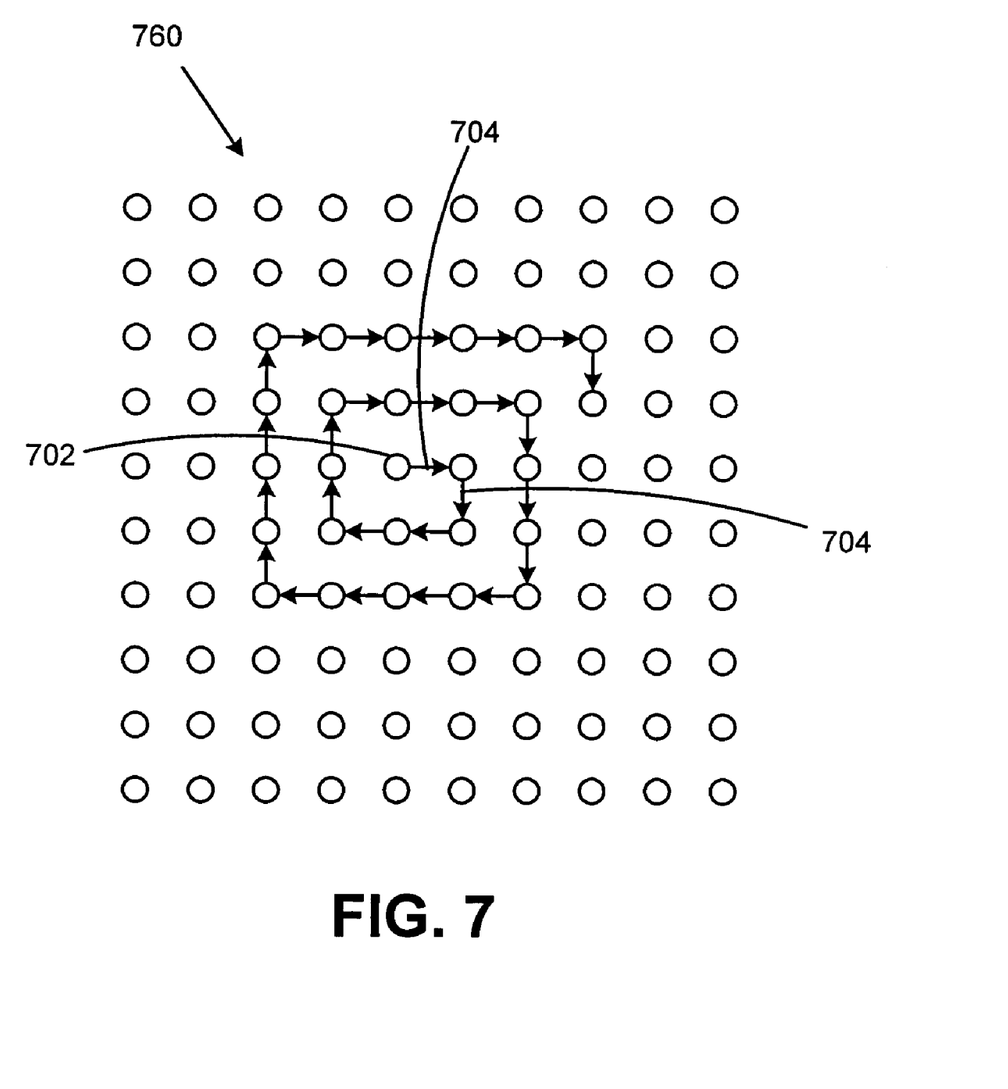
FIG. 7 is a schematic illustration of a sequence in which pixels of a data block may be adjusted in the course of applying a watermark to an image in accordance with the invention.

However the target value is selected, step 408 (FIG. 4) follows step 406. In step 406, the gray scale values of at least some pixels in the data block are adjusted to shift the average gray scale value of the data block toward the selected target value. In some embodiments, the first pixel values to be adjusted are those for pixels at the center of the data block, and the sequence of pixels selected for adjustment may continue outward in a spiral pattern, in the manner illustrated in FIG. 7. In FIG. 7, reference numeral 700 generally indicates the pixels which correspond to a single data block (assuming each data block represents a 10×10 array), and the pixel adjustment operation starts, e.g., with a central pixel 702. (It will be understood that another central pixel may be the first to be adjusted.) The sequence of pixels selected for adjustment may then continue in the manner indicated by arrow marks 704 in FIG. 7. The adjustment may be by a predetermined number of gray scale levels, such as 12 or 16 levels. If the target level selected at step 406 is lower than the average gray scale level for the data block, then the adjustment is made in a downward direction. If the target level selected at step 406 is higher than the average gray scale level for the data block, then the adjustment is made in an upward direction. An updated average of the gray scale levels of the pixels of the data block may be calculated after each pixel is adjusted, and the adjustment process may end when the average gray scale level for the pixel block is equal, or substantially equal, to the target level, or is within a predetermined neighborhood of the target level.

Figure 8:
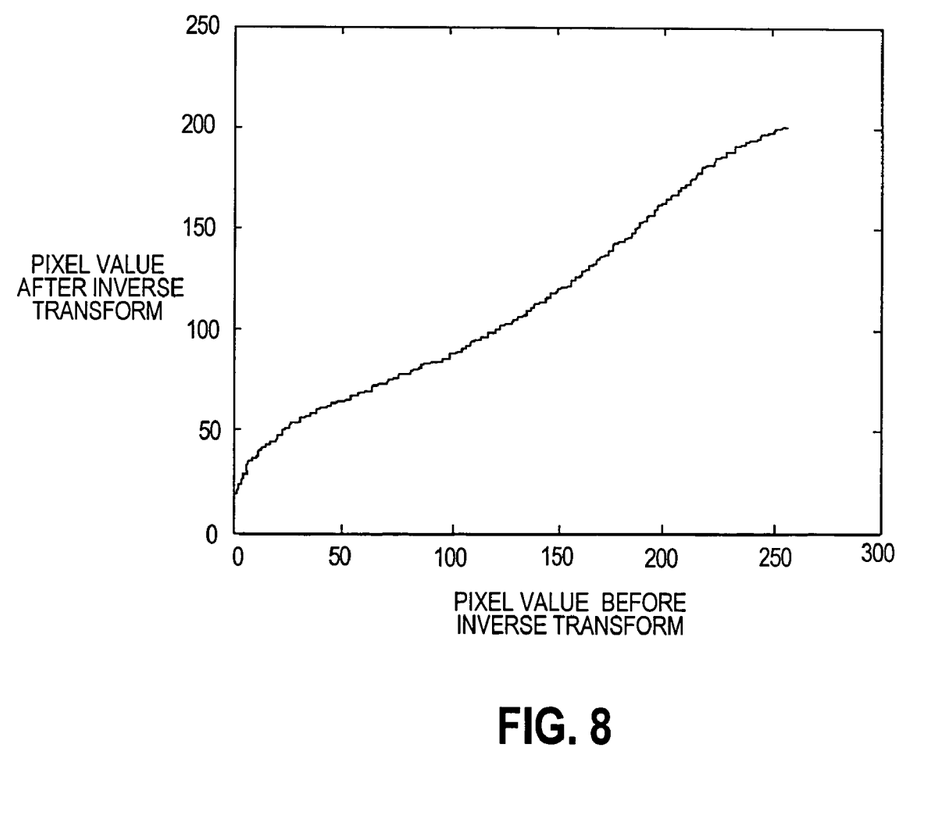
FIG. 8 is a graph that illustrates a transformation that is substantially the inverse of the transformation illustrated in FIG. 3.

When steps 404, 406, 408 shown in FIG. 4 have been performed with respect to each data block of the image to be watermarked, the application of the watermark indicated by step 204 in FIG. 2 is complete. Step 206 of FIG. 2 then follows. At step 206, the watermarked image is subjected to a transformation that is the inverse of the transformation that was applied at step 202. FIG. 8 is a graph that illustrates an example of the transformation that may be applied at step 206. In the graph of FIG. 8, the horizontal axis corresponds to pixel values prior to the transformation of step 206, and the vertical axis corresponds to pixel values to which the prior values are mapped by the transformation.

With the completion of step 206, the watermarked image data is now in condition for use in printing images, and may be loaded into the postage meter 102 (FIG. 1), as indicated at step 208 in FIG. 2. For example, the watermarked image data may be downloaded from the data center 108 to the control circuitry 106 of the postage meter 102 via the data communication channel 110. Alternatively, the image data may be copied onto a floppy disk or other transportable data storage medium. The storage medium may then be mailed to the lessor of the postage meter and used to load the watermarked image data into the postage meter.

In any event, once the watermarked image data is present in the postage meter 102, the control circuitry 106 may control the printer 104 to print watermarked images (step 210, FIG. 2), based on the watermarked image data, as part of postage meter indicia applied to mailpieces. In some embodiments, the image may be printed at a resolution of 200 gray scale dots (pixels) per inch. The resulting printed image may have an appearance such that there is little or no visible evidence of the watermarking process performed in accordance with FIGS. 2 and 4.

In accordance with conventional practices, the postage meter indicia may include other information, including, e.g., postage amount, date, mailing location, postage meter serial number, two-dimensional barcode, etc. The data center may continue to store data indicative of the target values selected for the data blocks of the image data, and the stored target value data may be indexed by the serial number of the postage meter. (Of course, if a standard watermarked image is used for all meters of a particular type, only one set of target value data need be stored for all of such meters).

Figure 9:
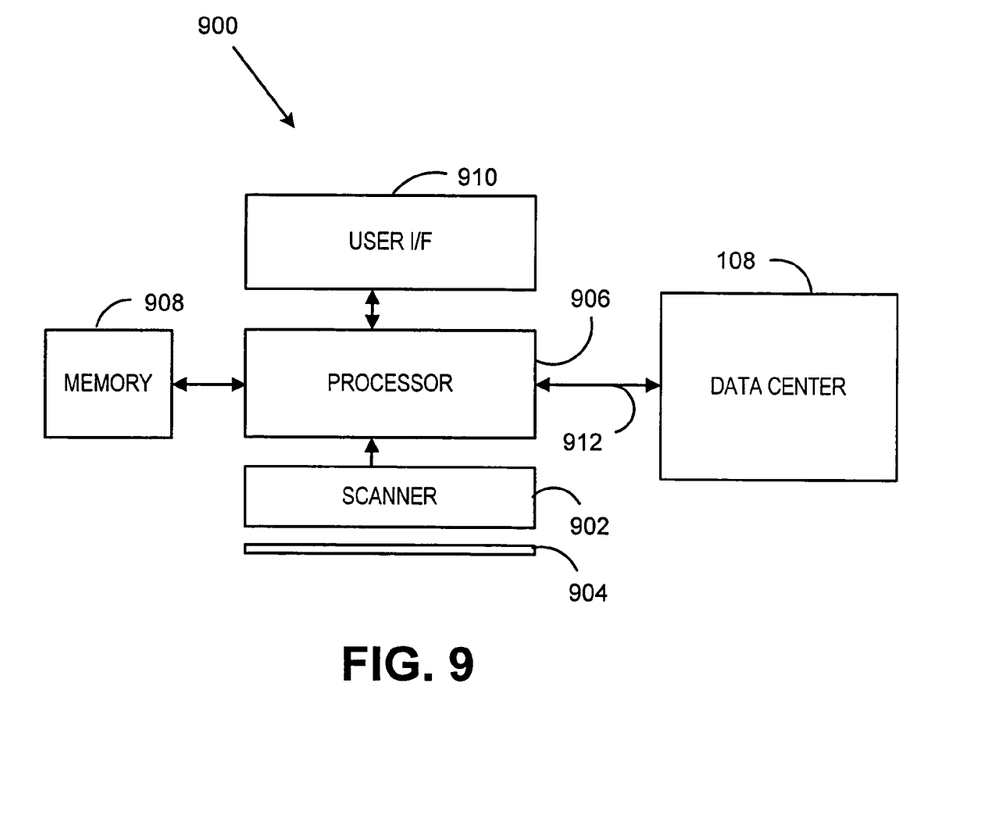
FIG. 9 is a block diagram of an apparatus that may be provided in accordance with the invention to examine printed images to determine whether the printed images are originals or copies.

FIG. 9 is a block diagram of an image examination apparatus 900 that may be provided in accordance with the invention to examine printed images (e.g., images included in postage indicia or purported indicia) to determine whether the printed images are originals or copies.

The image examination apparatus 900 may include a scanner 902 (e.g., a 600 dpi scanner) to scan a substrate 904 (e.g., a mailpiece) to generate scanning image data that represents a gray scale image (not separately shown) carried on the substrate 904. The printed gray scale image scanned by the scanner 902 may be referred to as the "printed-image-under examination" or "PIUE".

The image examination apparatus 900 further includes a processor 906 that is coupled to the scanner 902. The processor 906 may process scanned image data generated by the scanner 902, and may store scanned image data in a memory 908 that is coupled to the processor 906. The memory 908 may serve as a program store and as working memory, as well as a scanned image data store.

The image examination apparatus 900 may further include a user interface 910 which is coupled to the processor 906 to allow an operator of the apparatus to provide input to the processor and to receive output from the processor. In addition, the processor 906 may be temporarily or permanently coupled to a data center (which may be the data center 108 of FIG. 1) via a data communication channel 912.

Figure 10:
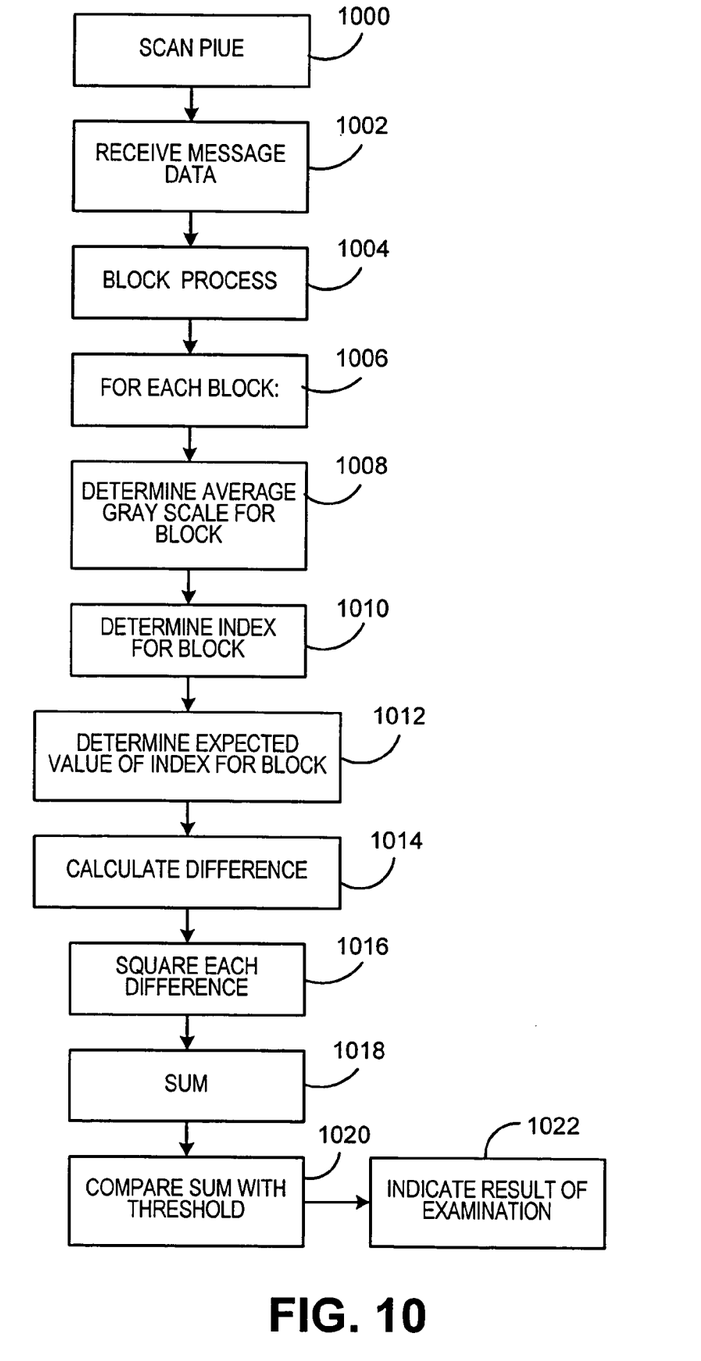
FIG. 10 is a flow chart that illustrates a process that may be provided in accordance with the invention to examine a printed image to determine whether the printed image is an original or a copy.

FIG. 10 is a flow chart that illustrates a process that may be performed in accordance with the invention by the image examination apparatus 900 of FIG. 9 to examine a PIUE to determine whether the PIUE is an original or a copy.

According to a first step 1000 in the process of FIG. 10, the apparatus 900 scans the PIUE via the scanner 902 to generate scanned image data. The scanned image data is made up of pixel data that is constituted by gray scale values and represents the PIUE as a set of scanning pixels. The scanned image data may be pre-processed by the processor 906 and/or stored in the memory 908.

Next is step 1002, at which the processor receives from the data center 108 the target value data that was stored for the watermarked image and/or a set of values (e.g., the values of the index k) that represents the target values for the data blocks of the watermarked image data generated in the process of FIGS. 2 and 4. In other embodiments, e.g., where all postage meters of a certain type print a standard watermarked image, the target value data and/or data representing the target values for the data blocks may have been previously stored in the memory 908, in which case step 1002 may be omitted.

Following step 1002 (or directly following step 1000, as the case may be) is step 1004, at which the scanned image data is divided into data blocks. The data blocks should be formed so as to correspond to the same spatial regions of the PIUE as the data blocks employed for the watermarking operation of FIG. 4. If, for example, the PIUE was printed with a resolution of 200 dpi, and 10×10 data blocks were used for watermarking, and if 600 dpi scanning was employed at step 1000, then the data blocks formed at step 1004 should be 30×30, and each of the data blocks formed at step 1004 should correspond to a region of the PIUE generated from a data block formed in the watermarking operation of FIG. 4.

Next, as indicated at 1006, each of steps 1008, 1010, 1012 and 1014 may be performed with respect to each of the data blocks formed at step 1004.

Thus, for a particular block, step 1008 indicates that an average gray scale level for the pixels in the block may be determined. For example, in the case of the 900-pixel blocks referred to in connection with step 1004, the pixel values of the 900 pixels could be summed and the resulting sum divided by 900 to obtain the average gray scale level for the data block.

After step 1008 is performed for a particular data block, step 1010 is performed for the data block. At step 1010, an index $h_{ij}$ is calculated for the data block, where i, j are the indices for the data block in the matrix of data blocks formed from the scanned image data. In some embodiments, $h_{ij}$ may be determined by dividing by eight the one of the potential target values 8*k that is closest to the average gray scale value determined at step 1008.

For each data block, step 1012 follows step 1010. At step 1012, a determination is made of the value k which corresponds to the target value selected for the corresponding data block in the process of FIG. 4. That is, that value of k is taken to be a quantity $g_{ij}$ which is the expected value of the index $h_{ij}$ based on the target value for the corresponding pixel data that was used to generate the PIUE (or the original printed image from which the PIUE was derived, in the case that the PIUE is not an original).

Following step 1012 for each data block is a step 1014. At step 1014 the difference $|h_{ij}-g_{ij}|$ is calculated.

After steps 1008, 1010, 1012, 1014 have been performed with respect to each of the data blocks formed at step 1004, step 1016 is performed. At step 1016 each of the differences obtained at step 1014 is squared. Then, at step 1018, the squared differences are summed. The resulting sum may be considered to represent the Euclidean distance between a vector of the index values determined at step 1010 and a vector of expected index values, and may be compared with a threshold (step 1020) to determine whether the PIUE is an original image or a copy.

In one embodiment, it has been found that about 2000 is a typical value for the sum obtained at step 1018 for an original printed image that is printed in a 180×240 pixel format with 10×10 pixel blocks used for watermarking at 32 possible index values (i.e. potential target values in the above-mentioned 8*k format). A first scanned-and-printed copy of such an original printed image has been found to result in a typical value of about 6000 for the sum obtained at step 1018. Thus, for a system which produces and examines images of this sort, a threshold of about 4000 could be used, with a result of step 1018 that is less than the threshold leading to a determination that the PIUE is an original printed image, and with a result of step 1018 that is greater than the threshold leading to a determination that the PIUE is not an original printed image.

Following step 1020 is a step 1022, at which the image examination apparatus 900 may indicate the result of the comparison of step 1020, by indicating via the user interface 910 whether or not the PIUE is an original printed image.

It will be appreciated that the PIUE that has been printed and then scanned for examination will generally result in a set of scanned image data that is distorted as compared to the original image data selected for watermarking at step 200. It is to prevent distortion of the watermark that the "inverse transformation" of step 206 is applied after application of the watermark. That is, the inverse transformation of step 206 in effect "pre-reverses" the distortion of the print-scan process, so that there is less distortion of the watermark as detected in the examination process of FIG. 10 than would be the case if step 206 were not included.

However, it has been found that the steps 202 and 206 can be omitted and the fragile watermark as described in FIG. 4 can still function adequately to distinguish original and copy images, albeit with somewhat less effectiveness than if steps 202 and 206 are employed.

In some embodiments, each original printed image may have printed therewith a set of sample gray scale levels (e.g., a strip of blocks respectively corresponding to every sixteenth gray scale level) as a calibration scale. With these known gray scale levels associated with the image, the examination process may examine the calibration scale and perform calibration adjustment of the scanned image data to compensate for variations in printer and/or scanner performance and/or variations in gray scale levels due to environmental conditions to which the printed image is exposed.

In some embodiments, fewer than all of the pixel blocks of the image data, and/or less than all of the image, may be subjected to the watermarking process. For example, certain parts of the image may be held back from watermarking to preserve esthetic qualities of the image. It is also possible, in some embodiments, that less than all of the PIUE would be examined for the presence of the watermark.

With the fragile watermark process of FIGS. 2 and 4, the resulting features of the printed image are likely to be affected by the process of copying an original printed image in a manner such that the examination process of FIG. 10 can be used to reliably distinguish between original printed documents (e.g., postage meter indicia) in which the watermark features are substantially present, and copies of original printed documents, with the watermark features having been substantially diluted or partially or largely destroyed by the scan-print process used to make the copies. Thus the present invention can be of substantial value in verifying the authenticity of original documents.

As used in the appended claims a first resolution may be said to be "less" than a second resolution, if the first resolution includes a smaller number of pixels per unit distance than the second resolution.

As used in the appended claims, pixel data that is "used to generate a printed image" includes pixel data that is subject to transformation in some manner prior to be used to drive a printer.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to verification of documents other than postage indicia. Other variations relating to implementation of the functions described herein can also be implemented. Accordingly, other embodiments are within the scope of the following claims.

What is claimed is:

1. A method of determining whether a printed-image-under-examination (PIUE) is a original printed image, with a fragile watermark the method comprising:
    (a) scanning the PIUE to generate scanned image data, the scanned image data comprising pixel data, the pixel data comprising gray scale values and representing the PIUE as a set of scanning pixels;
    (b) forming a plurality of data blocks from the scanned image data, each data block consisting of pixel data which corresponds to a respective region of the PIUE;
    (c) determining for each of the data blocks an average value of the pixel data in the data block;
    (d) determining for each of the data blocks an index value based on the average value of the pixel data in the data block;
    (e) for each data block, calculating a difference between the index value for the data block and a value that represents a target value for a corresponding block of pixel data that was used to generate the original printed image, and
    (f) determining whether the PIUE is the original printer images with the fragile watermark.

2. The method according to claim 1, wherein the index value for each data block is selected from a predetermined set of gray scale levels as a one of said set of gray scale levels to which the average value of the pixel data in the data block is closest.

3. The method according to claim 2, further comprising:
    (f) squaring the differences calculated in step (e).

4. The method according to claim 3, further comprising:
    (g) summing the squared differences.

5. The method according to claim 4, further comprising:
    (h) comparing a sum generated at step (g) with a threshold.

6. The method according to claim 5, further comprising:
    (i) providing an indication as to whether the PIUE is an original printed image on the basis of a result of step (h).

7. The method according to claim 1, wherein the PIUE was printed with a first resolution that is less than a second resolution at which the PIUE was scanned in step (a).

8. A method of determining whether a printed-image-under-examination (PIUE) is a original printed image, with a fragile watermark the method comprising:
    (a) scanning the PIUE to generate scanned image data, the scanned image data comprising pixel data, the pixel data comprising gray scale values and representing the PIUE as a set of scanning pixels;
    (b) forming a plurality of data blocks from the scanned image data, each data block consisting of pixel data which corresponds to a respective region of the PIUE;
    (c) determining for each of the data blocks an average value of the pixel data in the data block;
    (d) determining for each of the data blocks an index value based on the average value of the pixel data in the data block;
    (e) for each data block, calculating a difference between the index value for the data block and an expected value of the index value; and (f) determining whether the PIUE is the original printed image with the fragile watermark.

9. The method according to claim 8, wherein the index value for each data block is selected from a predetermined set of gray scale levels as a one of said set of gray scale levels to which the average value of the pixel data in the data block is closest.

10. The method according to claim 9, further comprising:
(f) squaring the differences calculated in step (e).

11. The method according to claim 10, further comprising:
(g) summing the squared differences.

12. The method according to claim 11, further comprising:
(h) comparing a sum generated at step (g) with a threshold.

13. The method according to claim 12, further comprising:
(i) providing an indication as to whether the PIUE is an original printed image on the basis of a result of step (h).

14. The method according to claim 8, wherein the expected value of the index value for each of the data blocks is representative of a target value that was used to generate pixel values for a corresponding pixel block of the original printed image.

* * * * *